United States Patent [19]
Patel

[11] Patent Number: 5,774,533
[45] Date of Patent: Jun. 30, 1998

[54] METHOD AND SYSTEM FOR PROVIDING A BILLING DIRECTED COMMUNICATION SERVICE

[75] Inventor: Navneet A. Patel, Marietta, Ga.

[73] Assignee: BellSouth Corporation, Atlanta, Ga.

[21] Appl. No.: 702,385

[22] Filed: Aug. 14, 1996

[51] Int. Cl.$^6$ ................................................. H04M 15/00
[52] U.S. Cl. .......................... 379/127; 379/114; 379/121; 379/132; 379/144; 379/229
[58] Field of Search .................................. 379/114, 115, 379/117, 118, 121, 126, 127, 144, 216, 219, 229, 230, 111, 112

[56] References Cited

U.S. PATENT DOCUMENTS

| | | | |
|---|---|---|---|
| 5,222,125 | 6/1993 | Creswell et al. | 379/67 |
| 5,479,494 | 12/1995 | Clitherow | 379/144 |
| 5,524,146 | 6/1996 | Morrisey et al. | 379/214 |
| 5,572,579 | 11/1996 | Orris et al. | 379/115 |
| 5,613,006 | 3/1997 | Reese | 379/142 |
| 5,666,405 | 9/1997 | Weber | 379/114 |
| 5,729,598 | 3/1998 | Kay | 379/114 |

*Primary Examiner*—Curtis A. Kuntz
*Assistant Examiner*—Binh K. Tieu
*Attorney, Agent, or Firm*—Jones & Askew, LLP

[57] ABSTRACT

A method and system for providing a billing directed communication service that allows the originating party to provide billing instructions on a per-communication basis. An originating party initiates a billing directed communication transmitting a unitary request in a predefined format. Initiating a billing directed communication does not require the originating party to engage in an interactive communication set-up procedure. The billing directed communication service may be applied to a particular telephone line 14a or cellular mobile radiotelephone (CMR) 16e so that any originating party knowing the appropriate unitary request format may use the service. Such a billing directed communication service may be accessed only by originating a communication using a telephone line 14a or CMR 16e to which the service has been applied. Alternatively, the billing directed communication service may be applied to a particular billing code such as a billing code associated with a particular terminating station. In this case, a billing directed communication service may be accessed from any originating station 16. The billing directed communication service may also be applied to a particular mobile telephone switching office (MTSO) 50 operated by a cellular mobile communication service provider. In this case, the accounting and billing resources of a land-based telecommunications system 11 provide accounting and billing services for a cellular mobile communication service provider.

26 Claims, 5 Drawing Sheets

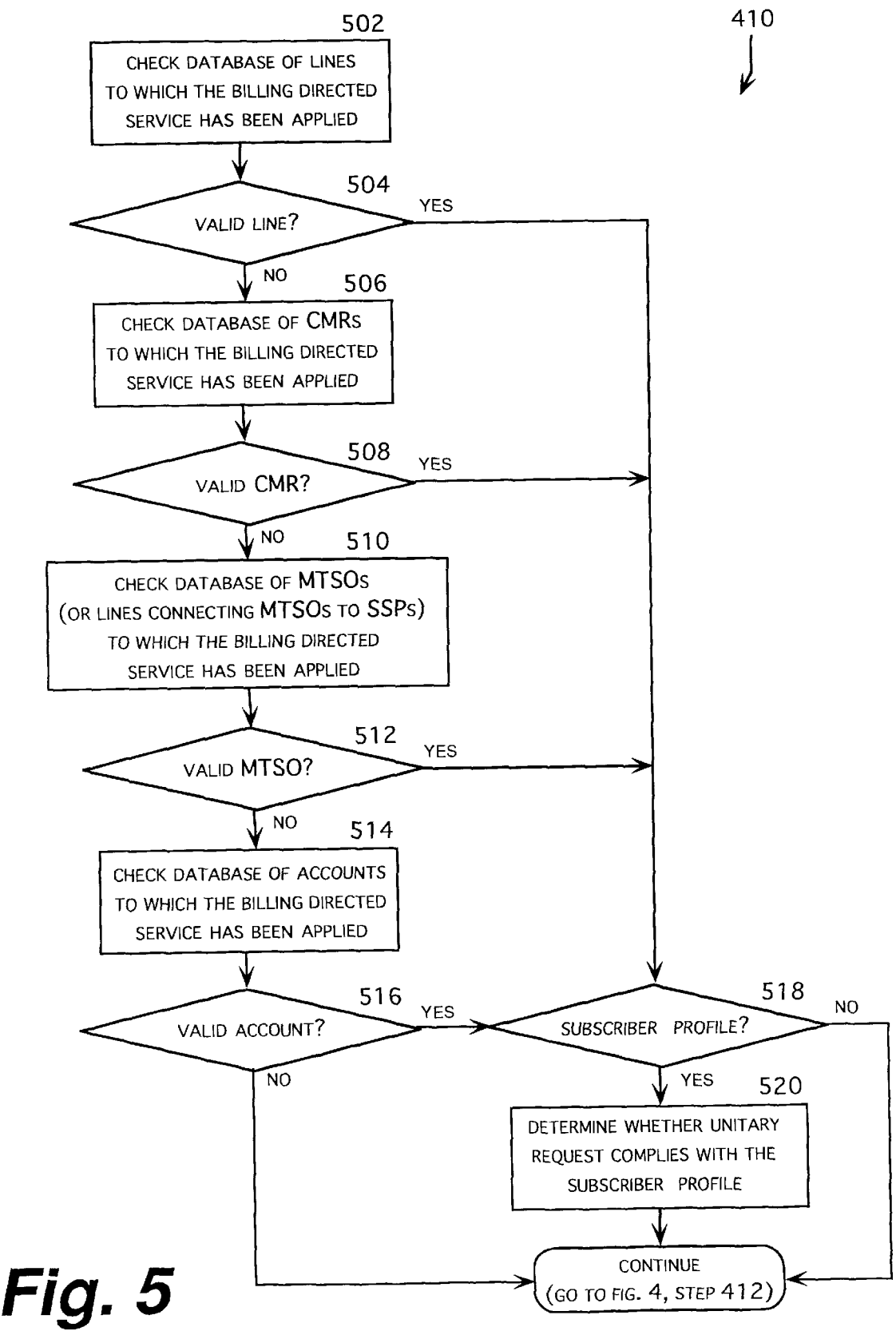

ns for the patent application.

METHOD AND SYSTEM FOR PROVIDING A BILLING DIRECTED COMMUNICATION SERVICE

TECHNICAL FIELD

The present invention relates generally to telecommunications systems and more particularly relates to a method and system for providing a communication service that accepts billing instructions on a per-communication basis.

BACKGROUND OF THE INVENTION

Alexander Graham Bell did not have to pay for his famous first telephone call to Watson. The rest of us are less fortunate. As a result, many telephone callers are concerned with the bills that result from the placement of telephone calls. In many cases, a party originating a telephone call would like to control the billing associated the telephone call. However, the options available to an originating party to provide billing instructions on a per-communication basis are limited. For example, an originating party may attempt to bill the cost of a communication to the called party as a "collect telephone call." Collect telephone calls have a number of limitations. First, a telephone service provider typically charges a premium for a collect telephone call. Second, the called party may not be willing to accept the charges. Third, only the called party may be billed for the cost of the collect telephone call.

More flexible billing instructions may be imparted on a per-communication basis by placing an "operated assisted telephone call." Placing an operator assisted telephone call also has significant limitations. First, a telephone service provider typically charges a premium for an operator assisted telephone call. Second, an operator assisted telephone call is generally time consuming to place because the originating party must identify a billing account to which the cost of the communication may be charged. The originating party must then wait while the operator obtains authorization to charge the cost of the communication to the identified account. Typically, the operator must contact a person authorized to accept the charges before an account may be charged for the cost of the communication. In some cases, the operator may be unable to obtain such authorization.

Alternatively, an originating party may bill the cost of a communication to an account associated with a calling card. A calling card is a telephone service credit card issued by a telephone service provider. Using a calling card also has significant limitations. First, an originating party must have a valid calling card account. Calling cards are typically issued only to telephone service subscribers and persons authorized by subscribers. Therefore, many originating parties do not have valid calling cards. Second, a calling card may only be used to bill the cost of a communication to the account associated with the calling card. An originating party may wish to bill the cost of a communication to an account other than the account associated with the originating party's calling card. For example, it would be advantageous if an originating party could charge the cost of a communication to any one of a variety of prespecified accounts. Similar limitations exist with respect to prepaid telephone cards. A prepaid telephone card is similar to a calling card except that the cost of a communication placed using a prepaid telephone card is charged against a prepaid account.

Generally, telephone service providers have a need for efficient methods and systems for providing sophisticated communication services. Intelligent platforms are generally required to maintain databases and implement algorithms required to provide such sophisticated communication services. Conventional systems capable of providing calling card services have been in use for many years. These conventional systems typically require a voice channel communication (i.e., a communication using a voice channel or "trunk circuit") to be routed from an originating station an intelligent platform, and then from the intelligent platform to the terminating station. These conventional systems thus rely on "double-trunked" voice channel circuits to complete a calling card communications. For example, in a typical regional telephone system, a single redundant pair of intelligent platforms may implement the calling card service for the entire system. Therefore, a calling card communication originating and terminating in Birmingham may be routed through an intelligent platform in Atlanta. Thus, a double trunked voice channel circuit—Birmingham-to-Atlanta-to-Birmingham— is required to connect the communication.

Double-trunked voice channel circuits inefficiently load long distance voice channel trunks. Telephone service providers have therefore developed intelligent switched telecommunications networks that implement sophisticated communication services without relying on long distance or double-trunked voice channel telephone circuits. Such systems typically use a network of data links to replace portions of previously required voice channel circuits. Data links are capable of transmitting digital data messages, but do not need to be capable of transmitting voice channel communications. Data links require less bandwidth than voice channel circuits, and are therefore much less expensive than voice channel circuits.

In an intelligent switched telecommunications network, a network of data links typically interconnects a plurality of intelligent platforms with a plurality of switches. Switches route voice channel communications, whereas intelligent platforms perform sophisticated data processing tasks. Switches and intelligent platforms communicate with each other by placing digital data messages on the network of data links. For example, an intelligent switched telecommunications network would complete the above described communication by establishing a voice channel circuit directly between the Birmingham originating station and the Birmingham terminating station through one or more Birmingham switches. Digital data messages relating to the communication exchanged between a Birmingham switch and the Atlanta intelligent platform would be transmitted over the network of data links. Thus, a long distance voice channel circuit would not be required to connect the communication. The operation of an intelligent switched telecommunications network is familiar to those skilled in the telecommunications art. See, for example, the commonly assigned pending U.S. patent application Ser. No. 08/204, 677 entitled "Method for Routing Calls Based on Predetermined Assignment of Caller's Geographic Locations," inventors Janine M. Irwin et al., filed Mar. 1, 1994, which is incorporated herein by reference.

Conventional calling card systems implemented on intelligent switched telecommunications networks involve the originating party in an interactive communication set-up procedure and therefore suffer from a significant disadvantage, as described below. In an intelligent switched telecommunications network, a communication requiring the use of an intelligent platform is typically received and temporarily held at a switch while the switch and the intelligent platform exchange digital data messages over the network of data links. Many switches and intelligent platforms may be simultaneously transmitting digital data messages over the network of data links. A "transaction ID" is therefore assigned to messages pertaining to a particular communication. A transaction ID is a precursor code transmitted along with a message that allows an intelligent platform or a switch to recognize that the message pertains to a particular communication. The use of a transaction ID allows a switch and an intelligent platform to engage in a bi-directional exchange of messages.

Maintaining a bi-directional message exchange capability between a switch and an intelligent platform for a particular purpose, also known as "keeping a transaction open," requires that the switch and the intelligent platform each maintain a transaction ID and other information related to the communication in memory. A "transaction" in this context is a bi-directional message exchange capability between two network elements for which each network element allocates a portion of memory. The allocated memory is used to store a transaction ID and other information that facilitates the conduct of a bi-directional exchange of messages.

Maintaining an open transaction occupies memory within the network elements participating in the transaction. Each intelligent platform in an intelligent switched telecommunications network presently has a limited amount of memory that can be allocated to transactions. Each intelligent platform thus supports only a limited number of simultaneous open transactions. It is therefore advantageous to close a transaction as soon as possible. The memory used to maintain the open transaction is thereby made available for use in association with another transaction.

A conventional calling card system requires that a transaction remain open during each interactive communication set-up procedure. A large number of simultaneous interactive communication procedures therefore requires a large amount of memory within an intelligent platform. Ultimately, significant costs must be incurred to provide increased intelligent platform processing capability, i.e., to increase the number of open transactions that can be maintained simultaneously.

Hou et al., U.S. Pat. No. 5,325,421, describes a voice-directed communications platform that provides a subscriber with the option to associate different voice labels with different directory numbers (calling labels) and billing accounts (billing labels). Typical calling labels are "call home" and "call office," and typical billing labels are "bill Visa," "bill home phone" and "bill office phone." A subscriber places a telephone call from an originating station to an intelligent voice recognition platform and then uses voice directions to cause the telephone call to be routed a particular terminating station. The subscriber may also use voice directions to cause the cost of the telephone call to be charged to a particular billing account.

To use the system described by Hou et al., a subscriber first sets up a subscriber voice-directed profile including calling labels and billing labels. To place a subsequent telephone call, the subscriber picks up an originating station and dials a predetermined subscription telephone number such as a "1-800" telephone number. A voice channel connection is then established between the originating station and an intelligent voice recognition platform known as a "Caller Identification Unit (CIU)." The CIU transmits an announcement asking the subscriber "what is your account code?". In response, the subscriber says or keys-in an account code. The CIU then plays an announcement asking the subscriber to repeat a series of random numbers. The subscriber repeats the random numbers and the CIU verifies the subscriber's voice. Assuming that the subscriber's voice is verified, the CIU plays an announcement asking the subscriber "what number do you wish to call?". In response, the subscriber keys-in a terminating station number or says a predefined calling label. The subscriber may then pause for a predefined duration and say a billing label. For example, a subscriber may place a telephone call by pick up a pay telephone, dialing the predefined "1-800" number, following the instructions to verify his or her voice, and then saying "call office," pausing a second or so, and then saying "bill office phone."

The system described by Hou et al. suffers from several inherent disadvantages. First, it can only be used by a subscriber personally. Other originating parties cannot use the system regardless of authorization by a subscriber. Second, using the system requires a time consuming interactive communication with the CIU. A more flexible communication service that accepts billing instructions on a per-communication basis would be advantageous. For example, it would be advantageous if such a service could be provided that is not limited to use by a subscriber, and that does not require a time consuming interactive communication.

Moreover, provision of an interactive voice channel service such as that described by Hou et al. requires the use of a voice channel circuit between the originating station and the CIU. Due to economies of scale, it would be advantageous if one or at most a few redundant pairs of CIUs were deployed to provide such a service. However, in a regional telecommunications system such as that operated by BellSouth Corporation, use of a single pair of CIUs located in Atlanta, for example, would mean that a local telephone call in Birmingham would require a long distance voice channel connection to Atlanta. A regional telecommunications service provider is therefore presented with a Hobson's choice: either provide a large number of CIUs distributed throughout the regional service area, or provide increased voice channel trunk capability to one or a few centralized CIU locations. In either case, providing such a service on a large scale would require a considerable investment in new resources. Cellular mobile radiotelephone (CMR) systems have become widely used in recent years. A party originating a communication from a CMR may wish to control the billing of the cost associated with the communication. It would also be advantageous if the accounting and billing resources of a land-based telecommunications system could be used to provide accounting and billing services for a cellular mobile communications service provider.

Thus, there is a need for an improved communication service that allows an originating party to provide billing instructions on a per-communication basis.

There is a further need for a communication service that allows an originating party other than the subscriber personally to provide billing instructions on a per-communication basis.

There is a further need for a communication service that allows an originating party to provide billing instructions on a per-communication basis without relying on voice recognition equipment.

There is a further need for a communication service that allows an originating party to provide billing instructions on a per-communication basis without engaging in an interactive communication set-up procedure.

There is a further need for a method and system for providing sophisticated communication services to a communication originating from a cellular mobile radiotelephone.

There is a further need for a method and system that allows the accounting and billing resources of a land-based telecommunications system to provide accounting and billing services for a cellular mobile communications service provider.

SUMMARY OF THE INVENTION

The present invention provides a method and system supporting a billing directed communication service that is initiated by a unitary request. As used herein, a "billing directed communication service" means a communication service that allows an originating party to provide a telecommunications system with billing instructions for a requested communication when the communication is originated. A "unitary request" as used herein means a unidirectional instruction message that is transmitted from an originating party to a telecommunications system in a predefined format. The telecommunications system is configured to automatically recognize and respond to instructions that are received in the predefined unitary request format.

Generally described, the present invention provides a method and system supporting a billing directed communication services. A communication is received from an originating station. The communication includes a unitary request for the billing directed communication service. The unitary request includes a trigger code, a billing code associated with an account, and a terminating station number associated with a terminating station. If the unitary request is valid, the communication is routed for connection between the originating station and the terminating station, and the cost associated with the provision of the communication is charged to the account specified in the unitary request.

The present invention allows an originating party to initiate a billing directed communication using a unitary request, such as the following request, on a per-communication basis:

trigger code, billing code, terminating station directory number, #

Placing such a billing directed communication using a unitary request does not require the originating party to engage in an interactive communication set-up procedure. Other code elements, such as a personal identification number (PIN) or long distance carrier code, may be required or optionally accepted within the unitary request. The billing code may also be transmitted to a terminating station as the calling line identification number (CLID).

The billing directed communication service is typically "applied" a particular telephone line or cellular mobile radiotelephone (CMR). As used herein, "applying" the billing directed communication service to a particular telephone line or CMR means that communications originating from the telephone line or CMR are authorized to use the billing directed communication service. Applying the billing directed communication service to a particular telephone line or CMR generally requires that a piece of information uniquely associated with the line or CMR, such as a directory number, be entered in a database that is used to validate unitary requests. Applying the billing directed communication service to a particular telephone line or CMR also generally requires that the owner or operator of the telephone line or CMR establish an account with the provider of the billing directed communication service so that billing statements may be tendered in connection with the provision of the billing directed communication service.

If the billing directed communication service is applied to a particular telephone line, an originating party knowing the appropriate unitary request format may access the service from only from a station connected to the telephone line to which the service has been applied. Similarly, if the billing directed communication service is applied to a particular CMR, an originating party knowing the appropriate unitary request format may access the service only from the CMR to which the service has been applied.

Alternatively, the billing directed communication service may be applied to a particular billing account, such as a billing account associated with a particular terminating station. Applying the billing directed communication service to a billing account rather than a particular telephone line or CMR allows the billing directed communication service to be accessed from any originating station.

The billing directed communication service may also be applied to a particular Mobile Telephone Switching Office (MTSO) operated by a cellular mobile communications service provider, for example by applying the billing directed communication service to a telephone line that is connected to the MTSO. If the billing directed service is applied to an MTSO, the originating party may initiate a billing directed communication by transmitting a message in the required unitary request format. Alternatively, the cellular mobile communications service provider may intercept an initiating message transmitted by the originating party and place the message in the required unitary request format. The communication is then routed for connection with a terminating station and billed in accordance with the instructions comprising the unitary request. Applying the billing directed communication service to an MTSO allows the resources of a land-based telecommunications system to provide sophisticated services to a communication originating from a CMR. In addition, the accounting and billing resources of a land-based telecommunications system can be used to provide accounting and billing services for a cellular mobile communications service provider.

More specifically described, the present invention is a method and system for providing a billing directed communication service in an intelligent switched telecommunications network including a switch, a service control point, and a data link functionally connecting the switch and the service control point. A communication from an originating station is received at the switch. The communication includes a unitary request for the billing directed communication service. The unitary request includes a trigger code, a billing code associated with an account, and a terminating station number associated with a terminating station. The billing code may be transmitted to the terminating station as the CLID.

In response to the trigger code, the switch sends a data link query message to the service control point. At the service control point, it is determined whether the unitary request is valid. If so, the service control point sends a data link response message to the switch. The data link response message instructs the switch to route the communication for connection between the originating and terminating stations, and to charge a cost associated with the provision of the communication to the account specified in the unitary request.

To determine whether the unitary request is valid, an inquiry can be conducted to determine whether (1) the originating station is associated with a predefined telephone line to which the billing directed communication service has been applied, (2) the originating station is a predefined CMR to which the billing directed communication service has been applied, (3) the communication was received from the originating station via an MTSO to which the billing directed communication service has been applied, or (4) the billing code corresponds to a predefined account to which the billing directed communication service has been applied. In addition, a unitary request may be validated with reference to a predefined subscribe profile that is associated with the line, CMR, MTSO, or billing account to which the service has been applied.

In view of the foregoing, it will be appreciated that the present invention supports an improved communication service that allows an originating party to provide billing instructions on a per-communication basis. The present invention also supports a communication service that allows an originating party other than a subscriber personally to provide billing instructions on a per-communication basis. The present invention also supports a communication service that allows an originating party to provide billing instructions on a per-communication basis without relying on voice recognition equipment. The present invention also supports a communication service that allows an originating party to provide billing instructions on a per-communication basis without engaging in an interactive communication set-up procedure. It will also be appreciated that the present invention provides a method and system that allows the resources of a land-based telecommunications system to provide sophisticated communication services to a communication originating from a cellular mobile radiotelephone. The present invention also provides a method and system that allows the accounting and billing resources of a land-based telecommunications system to provide accounting and billing services for a cellular mobile communications service provider.

That the present invention improves over the drawbacks of the prior art and provides the advantages described herein will become apparent from the detailed description of the preferred embodiment to follow.

BRIEF DESCRIPTION OF THE DRAWINGS

FIG. 5 is a logic flow diagram that illustrates a preferred method for determining whether a unitary request is valid.

DETAILED DESCRIPTION

Figure 1:
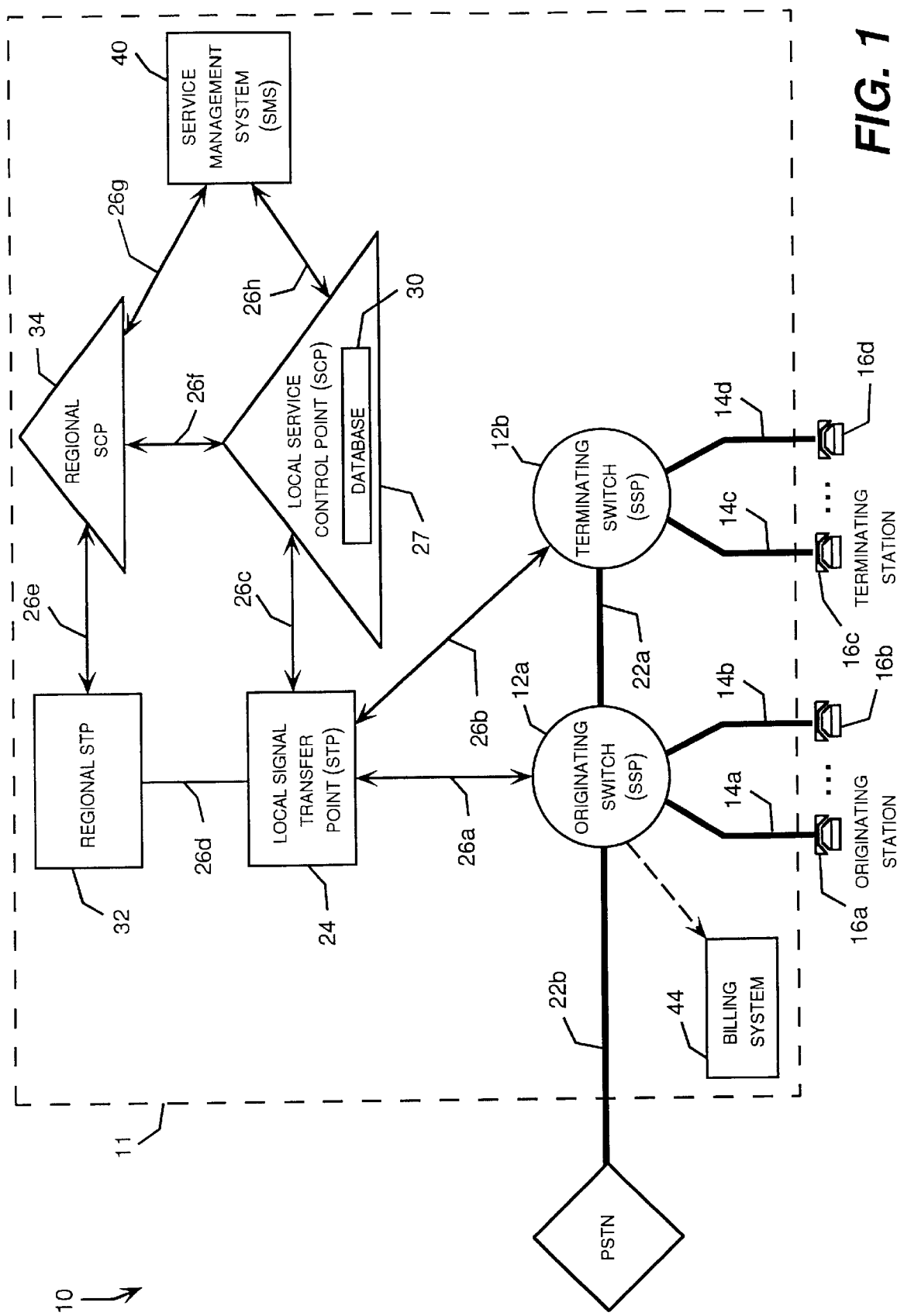
FIG. 1 is a diagram of an intelligent switched telecommunications network.

Referring now to the drawings, in which like numerals indicate like elements throughout the several figures, FIG.1 is a diagram of an intelligent switched telecommunications network. Referring to FIG. 1, a public switched telecommunications network (PSTN) 10 includes an Advanced Intelligent Network (AIN) 11 of a typical local exchange carrier. The AIN 11, which is well known to those skilled in the art, is the operating environment of the preferred embodiment of the present invention.

The AIN 11 includes a plurality of central offices switches with some of the central office switches equipped with service switching points (SSPs). Representative SSPs are shown as an originating switch 12a and a terminating switch 12b in FIG. 1. An SSP (specifically, a Class 5 central office switch) is the AIN component of a typical electronic central office switch used by a local exchange carrier. The terms "SSP" and "switch" are used interchangeably herein and are understood to refer to a telecommunications switch for connecting voice channel circuits, including voice channel lines, commonly designated as 14. Switches are interconnected through a network of high volume voice channel lines known as "trunks" commonly designated as 22. In the preferred embodiment, an SSP is equipped with AIN software release 0.1 or higher release. For more information, see Bellcore Specification TR-NWT-001284 Switching Systems Generic Requirements for AIN 0.1, which is incorporated herein by reference.

The number of switches in the AIN 11 is determined by present and forecasted applications of the network. As noted above, the AIN 11 also may comprise non-SSP central office switches (not shown). The difference between an SSP and a non-SSP switch is that an SSP has intelligent network functionality, including appropriate hardware and software for communicating with other intelligent components in the AIN 11. The intelligent components of the AIN 11 can communicate via digital data messages transmitted over a network of digital data links commonly designated as 26. A non-SSP switch can generate certain rudimentary data packets and provide them over the network of digital data links 26. However, the non-SSP switch must rely on other equipment to provide subscriber lines connected to such a non-SSP switch with more complex features and service functions available in the AIN 11.

An SSP is configured so that, when a predetermined set of conditions known as a trigger are detected in association with a communication, the SSP generates an appropriate digital data message for transmission over the network of digital data links 26. The SSP then suspends handling of the communication until it receives a reply from an appropriate network element via the network of digital data links 26 instructing the SSP to take a certain action. If the SSP receives no instructions within a certain amount of time, the SSP executes a default task with respect to the predetermined set of conditions. The originating switch 12a and the terminating switch 12b are preferably implemented as SSPs.

As is well known to those skilled in the art, the AIN 11 also includes a tandem switch (also referred to as a "tandem central office") that interconnects local offices, SSPs, and interexchange carriers (IXCs, which are Class 4 offices). In particular, if an interoffice trunk or an IXC trunk to an SSP becomes unavailable or overloaded, an alternate routing plan can be implemented so that calls are processed through the tandem to reach the SSP. As alternate routing paths, the tandem switches include the same equipment and are provided with the same information available to their respective SSPs.

Typically, the number of subscriber lines serviced by each SSP in the AIN 11 is on the order of 10,000 to 70,000 lines. Each subscriber line is connected to one or more pieces of terminating equipment. In FIG. 1, the terminating equipment is represented by telephones that are commonly designated as 16. Although telephones are illustrated as the pieces of terminating equipment, those skilled in the art will understand that terminating equipment may include other communication devices, such as wireless telephones, facsimile machines, computers, modems, etc.

The terminating equipment includes an originating station 16a that is operated by an originating party, and a terminating station 16c that is operated by a called party. Reference to the originating station and the terminating station will be useful in the description of the preferred embodiment, as set forth below, in which a communication, typically a telephone call, is connected between the originating station and the terminating station. By way of example, FIG. 1 illustrates the originating station 16a as connected via subscriber line 14a to the originating switch 12a, and the terminating station 16c as connected via subscriber line 14c to the terminating switch 12b. Switches 12a and 12b allow the subscriber lines 14a and 14c, respectively, to be selectively connected via the voice channel trunk 22a to complete a voice channel connection between the originating station 16a and the terminating station 16c.

Figure 2:
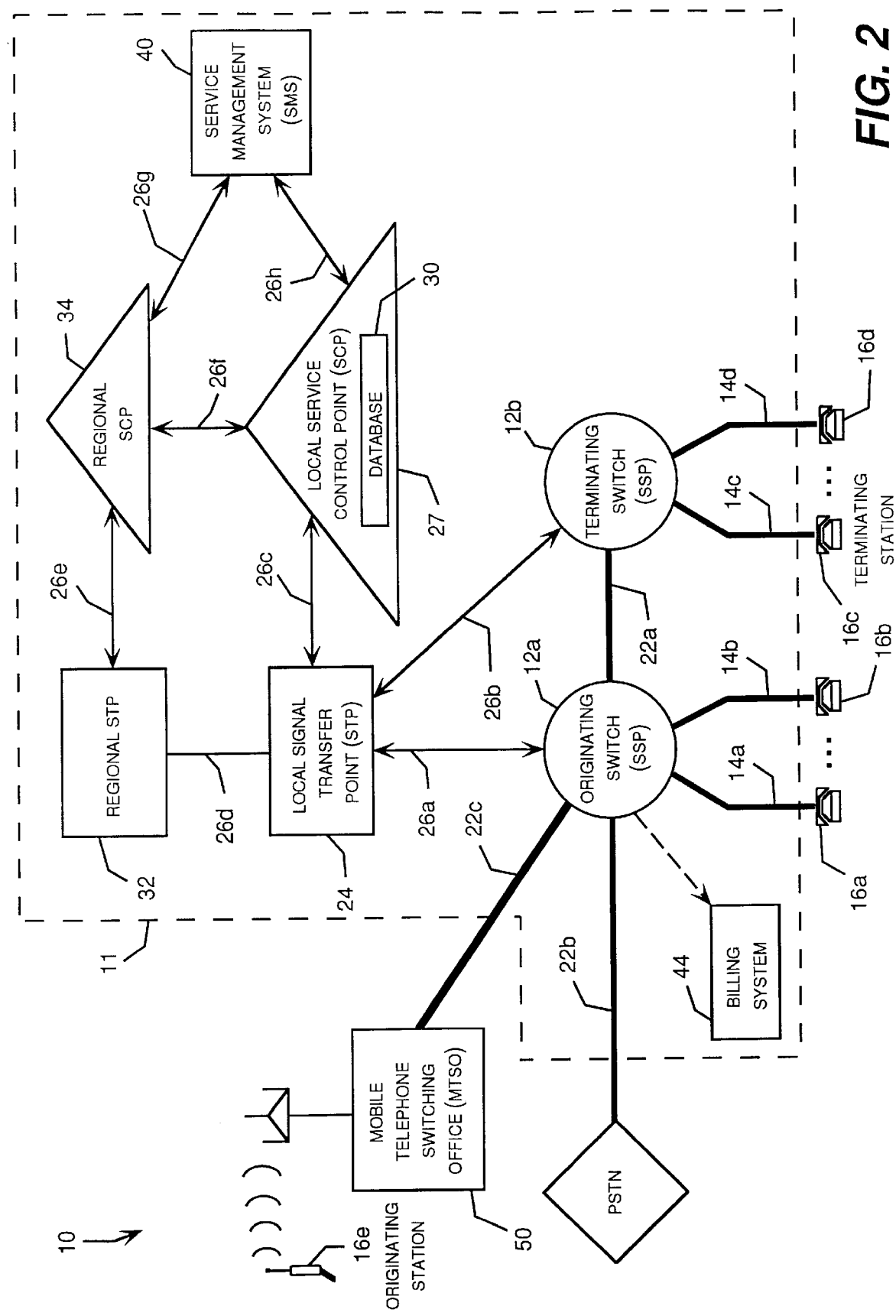
FIG. 2 is a diagram of an intelligent switched telecommunications network including a mobile telephone switching office.

Each piece of terminating equipment in the PSTN 10 is preferably assigned a directory number. As used herein, the term "directory number" is used in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 14a shown in FIG. 1. In addition, a directory number may be assigned to a specific cellular mobile radiotelephone (CMR) unit, such as a CMR 16e that is connected to the PSTN 10 by way of a Mobile Telephone Switching Office (MTSO) 50, as shown in FIG. 2.

It should be noted that a directory number is not necessarily assigned to a single piece of terminating equipment, but may be shared by several pieces of terminating equipment. For example, a household may include several different telephones, a facsimile machine, and a computer with a modem. It is likely that several telephones in the home will be assigned the same directory number, so that a communication that terminates at the home may be conveniently answered by any of the telephones in the home. However, it is likely that the facsimile machine and the computer each will have a different directory number from the directory number assigned to the home telephones. These numbers may be different because the communication services provided to the facsimile machine and to the computer may be billed differently from the telephones, or may be serviced differently from the telephones, or may be set-up so that their use does not interfere with the telephones.

The switches of the AIN 11 are interconnected by a network of trunk circuits represented by trunk 22a in FIG. 1. Trunks are the voice channel circuits that interconnect the central office switches to connect voice channel communications. The term "communication" is used herein to include all messages or communications that may be exchanged between two pieces of terminating equipment. It should be understood that central office trunking in a typical urban environment is not limited to a daisy chain arrangement, as implied by FIG. 1. In other words, a network of trunk circuits interconnect the originating switch 12a and the terminating switch 12b with other switches (not shown) servicing other the pieces of terminating equipment.

Each switch in the AIN 11 is connected to a local signal transfer point (STP) via a data link. This arrangement is represented in FIG. 1 by the originating switch 12a and the terminating switch 12b, which are connected to STP 24 by respective data links 26a and 26b. Currently, these data links are 56 kilobit per second bi-directional data links employing a signaling protocol referred to as Signaling System 7 (SS7), which is well known to those skilled in the art. STP 24 is a multi-port high speed packet switch that is programmed to respond to the routing information in the SS7 protocol, and route the packet to its destination. STPs are conventionally installed in redundant pairs (like the tandem central offices) with accompanying data links. The redundant devices are not illustrated for sake of simplicity in the drawings.

Much of the intelligence of the AIN 11 resides in local service control points (SCPs) represented by an SCP 27, which is connected to the STP 24 via an SS7 data link 26c. An SCP, such as the SCP 27, is an intelligent communication processing platform. As is known to those skilled in the art, SCPs are physically implemented by relatively powerful fault tolerant computers. Typical implementation devices include the Star Servicer FT Model 3200 or the Star Server FT Model 3300, both sold by American Telephone & Telegraph Company. Typically, SCPs are provided in redundant pairs. Among the functions performed by SCPs is the maintenance of network databases that are used in providing services. For example, the SCP 27 includes databases, such as a subscriber information database 30 having information related to the provision of billing directed communication services.

In order to keep the processing of communications as simple as possible, a relatively small set of triggers is defined for each communication. A trigger in the AIN 11 is an event associated with a particular communication that causes an SSP, such as the originating switch 12a, to generate a message packet to be sent to an SCP, such as the SCP 27. The message packet causes the SCP to query its database and undertake other processing steps to determine which customized communication features or service functions should be implemented for the communication. The results of the SCP's processing are sent back to the SSP in the form of a reply message packet. The SSP and the SCP may then exchange a series of bi-directional messages that may involve the originating party in an interactive communication set-up process. By this exchange of messages, the SCP obtains information from the originating party and provides the SSP with the information necessary to implement the customized communication features or service functions that should be implemented for the particular communication. Eventually, the SCP instructs the SSP to route the communication for connection with the terminating station. The details of communication routing are familiar to those skilled in the art and will not be further described herein. For more information, see Bellcore Specification TR-NWT-001284 Switching Systems Generic Requirements for AIN 0.1 referenced above.

Additional devices for routing communications among various local exchange carriers are provided by a regional STP 32 and a regional SCP 34. Both the regional SCP 34 and the local SCP 27 are connected via respective data links 26g and 26h to a service management system (SMS) 40. The SMS 40 is also implemented by a large general purpose computer and interfaces to business offices of the local exchange carrier and interexchange carriers. The SMS 40 downloads information to the databases of SCPs 27 and 34 when subscribers set-up or modify their ensemble of AIN services. Similarly, the SMS 40 downloads, on a non-realtime basis, billing information that is needed in order to appropriately invoice subscribers for the services provided.

A billing system 44 produces billing statements that are mailed to subscribers on an periodic basis. Information may be downloaded from the SMS 40 to the billing system, and vice versa, in association with the preparation of billing statements. Generally, the switch that initially receives a communication from an originating station, such as the originating switch 12a, creates a billing record for the communication. Each billing record generally includes the originating station directory number, the terminating station directory number, and the duration of the connection between the originating station and the terminating station. An additional billing code may be included in such a record. The billing records created by the switch 12a are periodically downloaded to the billing system 44 on a non-realtime basis. The billing system 44 computes the costs for the communications represented by the various billing records and prepares billing statements to be mailed to subscribers. Billing records and associated statements may be transferred from one telecommunications service provider to another for the purpose of transferring billing responsibility and/or preparing consolidated billing statements. The operation of a billing system of a telecommunications service provider, such as the billing system 44, is well known to those skilled in the art and will not be further described herein.

FIG. 2 illustrates an intelligent switched telecommunications network similar to that of FIG. 1, except that an MTSO 50 and a CMR 16e are also shown. CMRs have become widely used in recent years. It is therefore be advantageous to provide CMR subscribers with the sophisticated services that are made available through an intelligent switched telecommunications network, such as the AIN 11. Economies of scale may be attained if the resources of a land-based telecommunications system, such as the AIN 11, are used to provide sophisticated communication services to communications originating from a CMR, such as the CMR 16e. In addition, many cellular mobile communications service providers do not have the ability to cost effectively produce extensive billing records. These cellular mobile communications service providers spend considerable sums of money to engage outside service providers to handle their accounting and billing functions. Therefore, it is advantageous to use the accounting and billing resources of a land-based telecommunications system, such as the billing system 44, to provide accounting and billing services for a cellular mobile communications service provider, such as the cellular mobile communications service provider that operates the MTSO 50.

A CMR, such as the CMR 16e, is not associated with a particular land-based telephone line. Rather, a CMR transmits and receives radio frequency communications over the air waves via an MTSO, such as the MTSO 50. The MTSO, in turn, is functionally connected with the land-based PSTN 10. Several thousand CMRs are typically supported by an MTSO, such as the MTSO 50. In FIG. 2, the CMR 16e is designated as the originating station for a communication connected between the CMR 16e and the terminating station 16c.

The MTSO 50 is functionally connected to the AIN 11 by one or more voice channel circuits, which are represented by the trunk 22c connecting the MTSO 50 to the originating switch 12a. It will be appreciated that an alternative communication means, such as a microwave link, may functionally connect the MTSO 50 to the AIN 11. Functionally connecting the MTSO 50 to the AIN 11 allows the AIN 11 to receive and process communications originating from the CMR 16e via the MTSO 50. The MTSO 50 may modify a communication originating from the CMR 16e to place the communication in a certain format such as the required unitary request format described below. A communication received by the AIN 11 from the MTSO 50 in the required unitary request format is handled by the AIN 11 in the same manner as a communication originating from a land-based station that is received in the required unitary request format. The operation of an MTSO, such as the MTSO 50, is known to those skilled in the art and will not be further described herein. For more information, see the Electronic Industries Association/Telecommunications Industry Association Standard 533 (EIA-533), which is incorporated herein by reference.

The preferred embodiment of the present invention supports a method and system for providing a billing directed communication service that allows the originating party to provide billing instructions on a per-communication basis. A billing directed communication is connected between an origination station, preferably the telephone 16a (FIG. 1) or the CMR 16e (FIG. 2), and the terminating station 16c. The communication is received from the originating station 16a or 16e at the originating switch 12a. The communication includes a unitary request for a billing directed communication. The unitary request includes a trigger code, a billing code associated with an account, and a terminating station directory number. A transaction is opened for use in a bi-directional exchange of messages relating to the communication between the originating switch 12a and the SCP 27. The communication is held at the originating switch 12a while the originating switch 12a and the SCP 27 exchange messages via the network of digital data links 26. The originating switch 12a sends a query message including the information of the unitary request to the SCP 27. The SCP 27 determines whether the unitary request is valid. If the unitary request is invalid, the SCP 27 sends an error message to the originating switch 12a. The transaction is then closed and the originating switch 12a applies an error treatment to the communication. If the unitary request is valid, the SCP 27 sends a response message to the originating switch 12a instructing originating switch 12a to route the communication for connection to the terminating station 16c and to bill the account associated with the billing code for the cost of the communication. The transaction is then closed and the originating switch 12a executes the instructions received from the SCP 27.

The preferred embodiment allows an originating party to initiate a billing directed communication using a unitary request, such as the following request, on a per-communication basis:

trigger code, billing code, terminating station directory number, #

Other code elements, such as a personal identification number (PIN) or long distance carrier code, may be required or optionally accepted within the unitary request. The billing code may also be transmitted to the terminating station as the calling line identification number (CLID).

Placing such a billing directed communication does not require the originating party to engage in an interactive communication set-up procedure. Therefore, the time during which an open transaction is maintained between the originating switch 12a and the SCP 27 is minimized. This represents an improvement over conventional calling card systems because the amount of memory required within the originating switch 12a and the SCP 27 to accommodate billing directed communications is reduced. The originating switch 12a and the SCP 27 may therefore process a greater number of simultaneous billing directed communications.

The billing directed communication service is typically "applied" a particular telephone line, such as line 14a, so that an originating party knowing the appropriate unitary request format may access the service from only from a station connected to the telephone line to which the service has been applied, such as the originating station 16a. Similarly, the billing directed communication service may be applied to a particular CMR, such as CMR 16e. In this case, an originating party knowing the appropriate unitary request format may access the service from only the CMR 16e to which the service has been applied.

Alternatively, the billing directed communication service may be applied to a particular billing account, such as a billing account associated with the terminating station 16c. Applying the billing directed communication service to a billing account rather than a particular telephone line allows the billing directed communication service to be accessed from any originating station.

If the billing directed communication service is applied to the CMR 16c, the MTSO 50 may respond to the trigger code included in the unitary request and provide the functionality described herein with respect to the originating switch 12a. In other words, the MTSO 50 may operate as an originating SSP to provide the CMR 16c with a billing directed communication service. In this case, the MTSO 50 would be directly connected with the STP 24 by way of a data link (not shown) of the data link network 26.

However, a cellular mobile communications service provider may not have the capability to function as an originating SSP. In particular, a cellular mobile communications service provider may not have, or may not want to use, the accounting and billing resources required to implement billing directed communication services. The MTSO may therefore pass a communication in the unitary request format on to the originating switch 12a of the land-based AIN 11 without responding to the trigger code. If the MTSO 50 operates in this manner, the originating party using the CMR 16e may obtain billing directed communication services by establishing an account with the land-based telecommunications service provider and then initiating communications in the required unitary request format.

The billing directed communication service may also be applied to a particular MTSO, such as the MTSO 50. If the billing directed service is applied to the MTSO 50, the originating party may initiate a billing directed communication by transmitting a message in the required unitary request format. Alternatively, the cellular mobile communications service provider may intercept a conventional initiating message transmitted by the originating party and place the message in the required unitary request format. In this case, the originating party using the CMR 16e need not establish an individual account with the land-based telecommunications service provider, or use the unitary request format. Rather, the cellular mobile communications service provider establishes an account with the land-based telecommunications service provider, and places initiating communications in the required unitary request format. The communications received from the MTSO 50 in the required unitary request format are then routed by the originating switch 12a for connection with the terminating station 16c and billed in accordance with the instructions included in the unitary request. In this manner, the land-based AIN 11 is used to provide billing directed communication services to a communication originating from the CMR 16e. Moreover, the billing system 44 of the land-based AIN 11 is used to provide accounting and billing services for the cellular mobile communication service provider that operates the MTSO 50.

Still referring to FIGS. 1 and 2, the following description will refer to the AIN message protocol that is familiar to those skilled in the art. The AIN message protocol establishes the syntax for a standardized set of messages that may be exchanged amongst the components of the AIN 11 via the network of digital data links 26. The AIN message protocol defines certain categories or types of messages, including the query message, conversation message, and response message. A "type" designation associated with a message is one element of a message that conveys information regarding the message. The AIN message protocol also defines specific messages whereby each message performs a defined function and contains defined parameters in defined fields. The "Info_Analyzed" and "Analyze_Route" messages referred to below are specific messages. A network element of the AIN 11 receiving a specific message relies on the message type definition and the specific message definition in interpreting the message and responding in an appropriate manner. The details of the AIN message protocol are familiar to those skilled in the art and will not be further described herein except as noted below. For more information, see Bellcore Specification TR-NWT-001284 Switching Systems Generic Requirements for AIN 0.1 referenced above.

The provision of a billing directed communication service in response to a unitary request received from the originating station 16c (FIG. 1), or the originating CMR 16e via the MTSO 50 (FIG. 2), preferably involves at least the originating switch 12a, the STP 24, and the SCP 27. Other devices of the AIN 11, such as the regional STP 32, the regional SCP 34, the SMS 40, additional STPs and SCPs (not shown), and other intelligent platforms (not shown), may also be involved in the provision of demarcated telephone services. All of these devices are interconnected with the originating switch 12a via the network of digital data links 26 and may therefore transmit and receive data link messages in connection with the provision of billing directed communication services.

The operator of the AIN 11 applies the billing directed communication service to the line 14a, the CMR 16e, or the MTSO 50 by activating an AIN trigger at the originating switch 12a. This trigger causes the originating switch 12a to respond to a communication including a unitary request trigger code by holding the communication and initiating specialized communication handling procedures. Once the billing directed communication service has been applied, the preferred method for providing the billing directed communication service begins when the originating switch 12a receives a communication from the originating station 16c or 16e in the required unitary request format. The originating party preferably generates the unitary request by pressing the keys on a conventional touch-tone telephone 16c or CMR 16e.

In response to the unitary request trigger code, the originating switch 12a holds the communication while the originating switch 12a engages in a bi-directional exchange of data messages with the SCP 27 via the network of digital data links 26. In other words, the originating switch 12a defers routing the communication to the terminating station 16c until the originating switch 12a receives instructions from the SCP 27. As will be well known to those skilled in the art, the initial data link message generated by the originating switch 12a is a type of message generally known as a "query" message. The query message generated by the originating switch 12a in response to the recognized trigger is preferably a specific message generally known as an "Info_Analyzed" message. A query message is defined by the AIN protocol as a type of data link message that requires a reply. A query message indicates the beginning of a bi-directional data link exchange generally known as "transaction," i.e., a query message opens a transaction. A query message generated by the originating switch 12a typically includes the device's address, known as the "originating point code," the originating station's directory number, the terminating station's directory number, the trigger code, the billing code, and any additional identification information provided by the unitary request. The query message also generally includes a random number generated by the originating switch 12a that is used as a "transaction ID." The originating switch 12a and the SCP 27 may be simultaneously processing many communications. Thus, the transaction ID generated by the originating switch 12a is included in the reply to a query message so that the originating switch 12a can associate the reply message with a particular query message.

As is well known to those skilled in the art, a query message is transmitted from an SSP, such as originating switch 12a, via the network of digital data links 26 to an STP, such as STP 24. The STP 24 searches a database, usually with reference to the trigger code and/or the originating station directory number, to determine which SCP should receive the query message. The database search conducted by the STP 24 is generally required because the AIN 11 includes, in addition to the SCP 27, other SCPs (not shown). The SCP that should receive the query message is represented by SCP 27. The STP 24 adds to the query message the address of the SCP 27, known as the "destination point code," and the number of the SS7 data link that connects the STP 24 and the SCP 27. The STP 24 then transmits the query message to the SCP 27 via the data link 26c.

In response to receiving the query message, the SCP 27 opens a transaction by allocating approximately 24 bytes of memory for storing all or part of the contents of the query message. The SCP 27 stores most or all of the contents of the query message because the SCP 27 may use the trigger code, the billing code, the originating station's directory number, the terminating station's directory number, and any other identification information included in the query message to determine whether the unitary request is valid. The SCP 27 also stores the originating and destination point codes and the SS7 data link number so that the SCP 27 can include this information in the response message. This allows the STP 24 to avoid referring to its database again in connection with the transaction. The transaction opened by the SCP 27 corresponds to the transaction opened by the originating switch 12a. Information related to the communication stored at both the originating switch 12a and the SCP 27, such as the transaction ID generated by the originating switch 12a, allows the originating switch 12a and the SCP 27 to engage in a bi-directional exchange of messages related to the communication via the network of digital data links 26.

The SCP 27 performs the task of determining whether the unitary request is valid. Optionally, the SCP 27 also performs the task of determining whether the billing code is to be used as the CLID. The SCP 27 preferably responds the query message by referencing a database 30 to determine whether the unitary request is valid. The database includes information such as lists of predefined lines, CMRs, MTSOs, and billing accounts to which the billing directed service applies. The database may be arranged, in part, as a group of subscriber profiles. A subscriber profile preferably defines a scheme for implementing billing directed communication services for a particular subscriber or MTSO. According to subscriber profiles, each predefined line. CMR, and MTSO may have a corresponding list of billing accounts and/or terminating station directory numbers that are valid for use with that particular line, CMR, or MTSO. In addition, certain billing accounts may be valid for use from any originating station. In this case, such a billing code is typically associated with a list of terminating station directory numbers that are valid for use with the billing account. Other code elements, such as a personal identification number (PIN) or long distance carrier code, may be required or optionally accepted within a unitary request. The unitary request may also include a code element that indicates that the billing code is to be transmitted to the terminating station as the calling line identification number (CLID). Alternatively, the SCP 27 may automatically use the billing code or some other predefined number as the CLID in accordance with the scheme defined by a subscriber profile. It will be appreciated that many variations and modifications to the embodiments described herein may be included in schemes defined by subscriber profiles and that such variations and modifications are within the scope and spirit of the present invention.

If the unitary request is invalid, the SCP 27 sends a data link response error message to the originating switch 12a. The transaction is then closed and the originating switch 12a applies an error treatment to the communication. If the unitary request is valid, the SCP 27 sends a data link message to the originating switch 12a instructing it to route the communication for connection with terminating station 16c. This data link message is preferably a specific message generally known as an "Analyze_Route" message. The "Analyze_Route" response message generated by the SCP 27 also instructs the originating switch 12a to bill the cost of the communication to the account associated with the billing code included in the unitary request. The transaction is then closed and the originating switch 12a executes the instructions received from the SCP 27. Not engaging the originating party in an interactive communication process, and thus closing the transaction as soon as possible, is an important aspect of the preferred embodiment. This aspect of the preferred embodiment is described more fully below.

As is well known to those skilled in the art, a reply message generated by the SCP 27 in response to a query message received from a switch such as the originating switch 12a may be one of two types: a "conversation" message or a "response" message. A conversation message is defined by the AIN message protocol as a type of data link message that requires a reply as part of a preexisting transaction. In other words, a conversation message keeps a transaction open. Conversation messages are used generally by an SCP 27 to obtain information from the originating party. In conventional calling card systems, a conversation message is used by the SCP 27 to instruct the originating switch 12a to play a voice channel message that prompts the originating party to input information. For example, the SCP 27 may instruct the originating switch 12a to "play message x" and to return the data received from the originating party in response to the message. Message x may prompt the originating party to "please input your account number (or terminating station number, or PIN, or long distance carrier code, etc.) followed by the # sign." Conversation messages allow an originating party to initiate a communication with a relatively short triggering sequence, and then provide any remaining requisite identification information through an interactive communication set-up process.

In association with a conversation message, the SCP 27 generates a second transaction ID that is stored relative to the communication. The transaction ID generated by the SCP 27 is returned to the SCP 27 by the originating switch 12a in the reply conversation message. In general, a transaction ID is generated by a network element in association with a message requiring a response. Associating the conversation message with a new transaction ID (i.e., a transaction ID generated by the network element that generated the conversation message) virtually eliminates the possibility that any two messages will be assigned the same transaction ID.

As explained above, a conversation message is one of the two types of reply messages. The other type of message is a "response" message. A response message is defined by the AIN message protocol as a type of data link message that completes a bi-directional data link exchange of messages. In other words, a response message closes a transaction that was opened by a query message. As a response message does not require a reply, the SCP 27 does not generate a transaction ID in association with a response message. Each billing directed communication processed by the preferred methods of the present invention involved a single back-and-forth message exchange. Therefore, an SCP-generated transaction IDs in not required in association with such a billing directed communication. The methods of conventional calling card systems, on the other hand, require the use conversation messages in association with each calling card communication. The methods of conventional calling card systems therefore require an SCP-generated transaction ID in association with each calling card communication. It will therefore be appreciated that the methods of the preferred embodiment improve over the methods of conventional calling card systems by obviating the need for the SCP 27 to generate a transaction ID in association with each communication processed by the SCP 27. This aspect of the preferred embodiment greatly reduces the data processing load on the SCP 27.

As a response message is required to close a transaction, a transaction relating to a particular communication remains open from the time the originating switch 12a transmits a query message relating to the communication until the SCP 27 transmits a response message relating to the communication. The memory allocated by the originating switch 12a and the SCP 27 to keep the transaction open thus remains occupied until the SCP 27 transmits a response message that closes the transaction. The SCP 27 has a limited amount of memory to allocate to transaction. Therefore, the length of time during which a transaction is held open is a critical factor for an SCP, such as SCP 27, that handles a large number of communications. More specifically, the number of communications that an SCP 27 can handle simultaneously is limited by the length of time during which a transaction is held open.

It will be appreciated that it is advantageous to close a transaction as soon as possible. According to the preferred embodiment, the time during which the transaction is held open is minimized because a response message sent by the SCP 27 immediately follows a query message sent by the originating switch 12a. By eliminating conversation messages that are used to engage the originating party in an interactive communication set-up procedure, the preferred embodiment represents an improvement over the methods of conventional calling card systems. It will therefore be appreciated that preferred embodiment of the present invention, as compared to the methods of conventional calling card systems, greatly increases the number of simultaneous billing directed communications that the SCP 27 can support.

Figure 3:
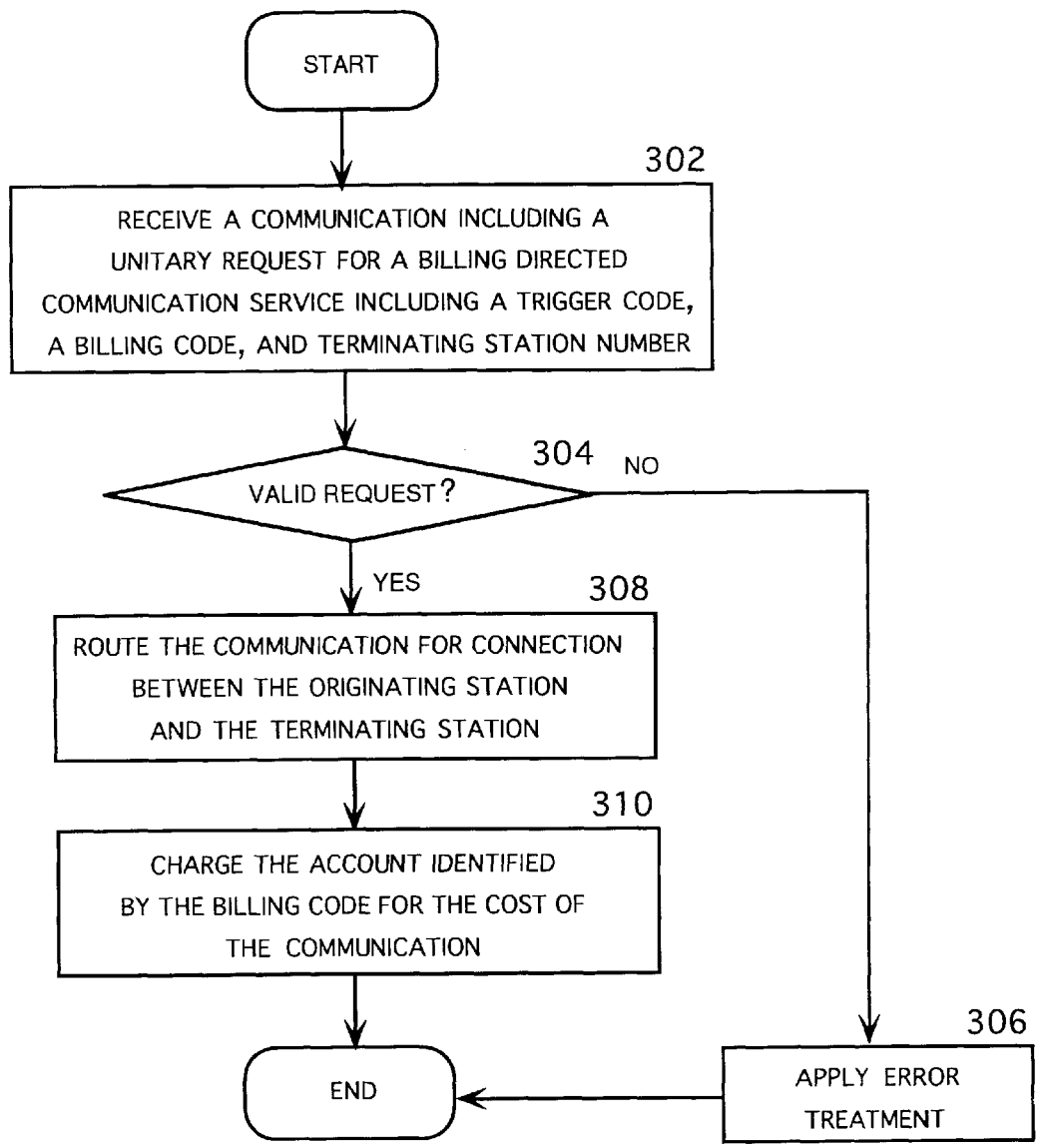
FIG. 3 is a logic flow diagram that illustrates a preferred method for providing a billing directed communication service.

FIG. 3 is a logic flow diagram that illustrates a preferred method for providing a billing directed communication service. Referring to FIG. 3, in step 302, a communication is received from an originating station. The communication preferably includes a unitary request for a billing directed communication service including a trigger code, a billing code associated with an account, and a terminating station directory number. In step 304, it is determined whether the unitary request is valid. If the unitary request is invalid, the "NO" branch is followed to step 306 in which an error treatment is applied. The communication may simply be disconnected at this point and the method illustrated by the logic flow diagram of FIG. 3 is terminated at the end step. Alternatively, an error message may be played that informs the originating party of the error and that allows the originating party to try again up to three times. If the originating party fails three times to input a correct response or fails to respond for a predetermined time-out period, the communication is preferably disconnected and the method illustrated by the logic flow diagram of FIG. 3 is terminated at the end step.

If the unitary request is valid, the "YES" branch is followed from step 304 to step 308 in which the communication is routed for connection with the terminating station identified by the terminating station directory number included in the unitary request. In step 310, the cost of the communication is charged to the account identified by the billing code included in the unitary request and the method illustrated by the logic flow diagram of FIG. 3 is terminated at the end step.

Figure 4:
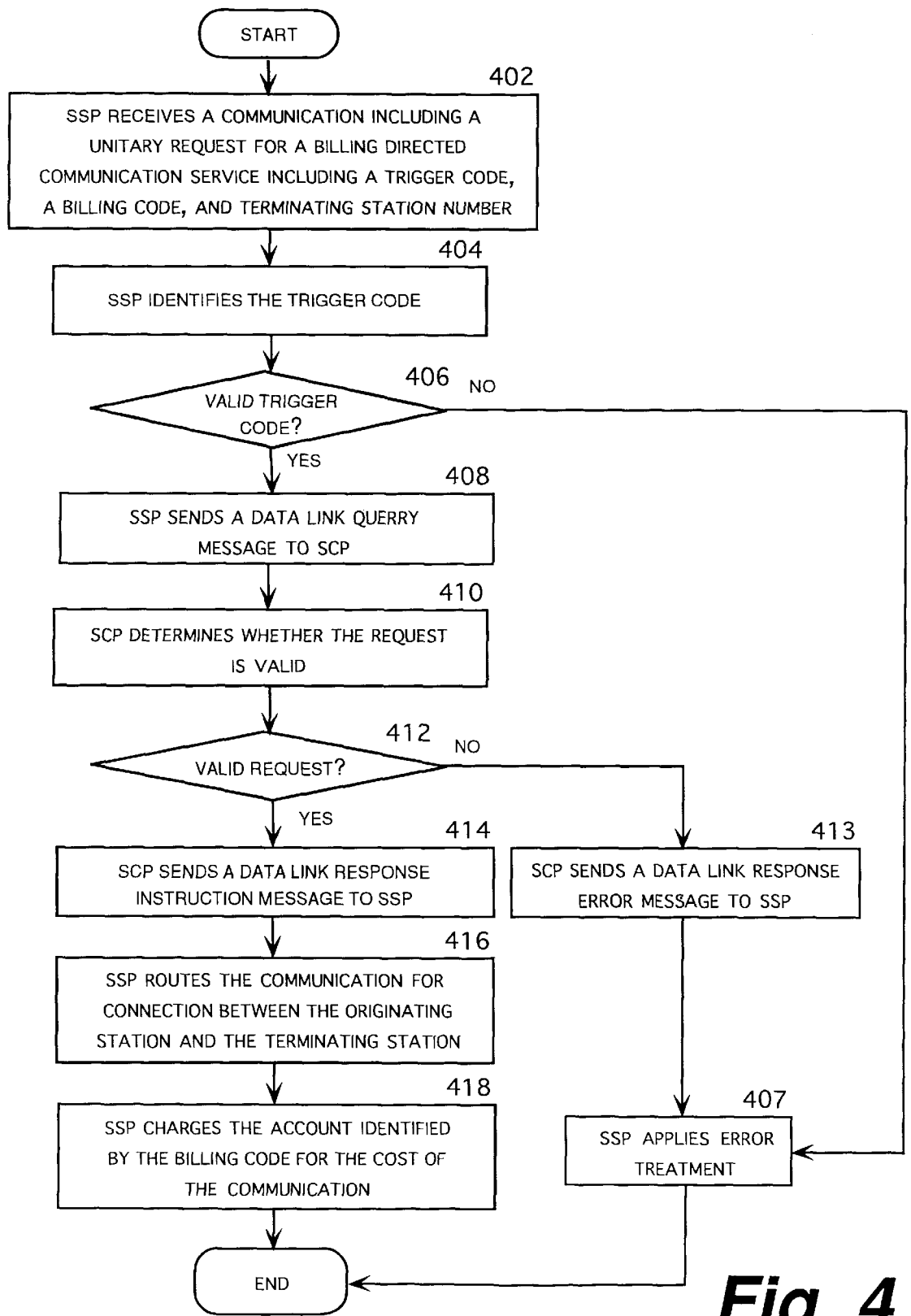
FIG. 4 is a logic flow diagram that illustrates a preferred method for providing a billing directed communication service within the operating environment of an intelligent switched telecommunications network.

FIG. 4 is a logic flow diagram that illustrates a preferred method for providing a billing directed communication service within the operating environment of an intelligent switched telecommunications network, such as the AIN 11. By way of example, the preferred method shown in FIG. 4 will be described in the context of the operating environments illustrated in FIGS. 1 and 2 and with reference to the AIN message protocol familiar to those skilled in the art. It will be appreciated that the communication handling method illustrated by the logic flow diagram of FIG. 4 is not limited to operation within the operating environments of FIG. 1 or 2, or to the AIN message protocol, but rather extends to any environment in which the inventive method may be employed.

In step 402, the originating switch 12a receives a communication from the originating station 16a shown in FIG. 1. Alternatively, the communication may be received from the originating CMR 16e via the MTSO 50 shown in FIG. 2. The received communication is typically an originating party's input associated with the placement of a conventional telephone call. For example, the communication may be created when the originating party activates the originating station and begins to place a telephone call by pressing the keys on a conventional touch-tone telephone or CMR. The communication preferably includes a unitary request for a billing directed communication service including a trigger code, a billing code associated with an account, and a terminating station directory number.

In step 404, the originating switch 12a recognizes the trigger code as a potential AIN trigger. The originating switch 12a responds to the trigger code by holding the communication and, in step 406, determining whether the trigger code included in the unitary message is a valid AIN trigger. If the trigger code is invalid, the "NO" branch is followed to step 407 in which the originating switch 12a applies an error treatment, and the method illustrated by FIG. 4 is terminated at the end step. If the trigger code is a valid AIN trigger, the "YES" branch is followed to step 408 in which the originating switch 12a sends an Info__Analyzed query message to the SCP 27 over the network of digital data links 26 via the STP 24. The Info__Analyzed query message includes a transaction ID generated by the originating switch 12a. The query message opens a transaction for which the originating switch 12a and the SCP 27 each allocate approximately 24 bytes of memory.

In routine 410, the SCP 27 references the database 30 to determine whether the unitary request is valid. The steps associated with routine 410 will now be described below with reference to FIG. 5, which is a logic flow diagram that illustrates a preferred method for determining whether a unitary request is valid. In a first embodiment illustrated by FIG. 1, the billing directed communication service is applied to a particular telephone line, such as the telephone line 14a. In step 502, the SCP 27 checks a database of telephone lines to which the billing directed service has been applied. In decision step 504, the SCP 27 determines whether the originating station is connected to a telephone line to which the billing directed service has been applied, such as the telephone line 14a. If so, the "YES" branch is followed to step 518, which is discussed below. If the originating station is not connected to a telephone line to which the billing directed service has been applied, the "NO" branch is followed to decision step 506.

In an alternative embodiment illustrated by FIG. 2, the billing directed communication service is applied to a particular CMR, such as the CMR 16e. In step 506, the SCP 27 checks a database of CMRs to which the billing directed service has been applied. In decision step 508, the SCP 27 determines whether the originating station is a CMR to which the billing directed service has been applied, such as CMR 16e. If so, the "YES" branch is followed to step 518, which is discussed below. If the originating station is not a CMR to which the billing directed service has been applied, the "NO" branch is followed to decision step 510.

For a third embodiment, also illustrated by FIG. 2, the billing directed communication service is applied to a particular MTSO, such as the MTSO 50. In step 510, the SCP 27 checks a database of MTSOs to which the billing directed service has been applied. It should be understood that the MTSOs may be referenced according to the trunk circuits that connect them to the AIN 11. Thus, the database of MTSOs to which the billing directed service has been applied may, in fact, be a database of trunk circuits that connect the MTSOs to the SSPs of the AIN 11. For example, if the billing directed service has been applied to the MTSO 50, the database of the SCP 27 may indirectly refer to the MTSO 50 by directly referring to the trunk circuit 22c, which connects the MTSO 50 to the SSP 12a of the AIN 11.

In decision step 512, the SCP 27 determines whether the originating station is connected to the originating switch 12a via an MTSO to which the billing directed service has been applied, such as the MTSO 50. If so, the "YES" branch is followed to step 518, which is discussed below. If the originating station is not connected to the originating switch 12a via an MTSO to which the service has been applied, the "NO" branch is followed to decision step 514.

In a fourth embodiment, the billing directed communication service is applied to a particular billing account, such as a billing account associated with the terminating station 16c. In step 514, the SCP 27 checks a database of billing accounts to which the billing directed service has been applied. In decision step 516, the SCP 27 determines whether the unitary request identifies a billing account to which the billing directed service has been applied. If so, the "YES" branch is followed to step 518, which is discussed below. If the unitary request does not identify a billing account to which the billing directed service has been applied, the "NO" branch is followed to the continue step in which the logic flow diagram illustrated by FIG. 4 continues at step 412.

In step 518, to SCP 27 determines whether a subscriber profile applies to the billing directed communication. If not, the "NO" branch is followed to the continue step in which the logic flow diagram illustrated by FIG. 4 continues at step 412. If a subscriber profile does apply to the communication, the "YES" branch is followed to step 520 in which the SCP 27 determines whether the unitary request complies with the subscriber profile. According to subscriber profiles, each predefined line, CMR, and MTSO may have a corresponding list of billing accounts and/or terminating station directory numbers that are valid for use with that particular line, CMR, or MTSO. In addition, certain billing accounts may be valid for use from any originating station. In this case, such a billing account is typically associated with a list of terminating station directory numbers that are valid for use with the billing account. Other code elements, such as a personal identification number (PIN) or long distance carrier code, may be required or optionally accepted within a unitary request. Following step 520, the logic flow diagram illustrated by FIG. 4 continues at step 412.

Returning to FIG. 4, in decision step 412, it is determined whether the unitary request is valid. If the unitary request is invalid, the "NO" branch is followed to step 413 in which the SCP 27 sends an error message to the originating switch 12a. The error message is preferably a response type message that closes the transaction associated with the communication and thereby frees the memory allocated for the transaction by the originating switch 12a and the SCP 27. In step 407, the originating switch 12a the applies an error treatment to the communication and the method illustrated by the logic flow diagram of FIG. 4 is terminated at the end step.

If the unitary request is valid, the "YES" branch is followed from step 412 to step 414 in which the SCP 27 sends an Analyze_Route response message to the originating switch 12a. The Analyze_Route response message instructs the originating switch 12a to route the communication for connection with the terminating station 16c. The Analyze_Route response message also closes the transaction associated with the communication and thereby frees the memory allocated for the transaction by the originating switch 12a and the SCP 27. In 418, the originating switch 12a routes the communication for connection with the terminating station identified by the terminating station directory number included in the unitary request. In step 418, the cost of the communication is charged to the account identified by the billing code included in the unitary request and the method illustrated by the logic flow diagram of FIG. 4 is terminated at the end step.

In view of the foregoing, it will be appreciated that the present invention supports an improved communication service that allows an originating party to provide billing instructions on a per-communication basis. The present invention also supports a communication service that allows an originating party other than a subscriber personally to provide billing instructions on a per-communication basis. The present invention also supports a communication service that allows an originating party to provide billing instructions on a per-communication basis without relying on voice recognition equipment. The present invention also supports a communication service that allows an originating party to provide billing instructions on a per-communication basis without engaging in an interactive communication set-up procedure. It will also be appreciated that the present invention provides a method and system that allows the resources of a land-based telecommunications system to provide sophisticated communication services to a communication originating from a cellular mobile radiotelephone. The present invention also provides a method and system that allows the accounting and billing resources of a land-based telecommunications system to provide accounting and billing services for a cellular mobile communications service provider.

It should be understood that the foregoing relates only to specific embodiments of the present invention, and that numerous changes may be made therein without departing from the spirit and scope of the invention as defined by the following claims.

What is claimed is:

1. A method of providing a billing directed communication service, comprising the steps of:

receiving a communication from an originating station associated with an account number identifying an account that is normally charged for telephone calls initiated from the originating station, said communication comprising a unitary request for said billing directed communication service, said unitary request comprising a trigger code, a billing code identifying a billing account that is different from the account that is normally charged for telephone calls initiated from the originating station, and a terminating station number associated with a terminating station;

determining whether said unitary request is valid by comparing the received billing code to a list of billing codes in a subscriber profile; and if said unitary request is valid, routing said communication for connection between said originating and terminating stations, and charging a cost associated with the provision of said communication to the billing account identified by the received billing code.

2. The method of claim 1, wherein the account number that is normally charged for telephone calls initiated from the originating station is selected from the group including:

a directory number assigned to a telephone line that connects the originating station to a telecommunications switch that receives the communication from the originating station and routes the communication for connection between the originating and terminating stations;

a directory number assigned to a cellular mobile radiotelephone that is in communication with a telecommunications switch that receives the communication from the originating station and routes the communication for connection between the originating and terminating stations; and a directory number assigned to a telephone line that connects a mobile telephone switching office to a telecommunications switch that receives the communication from the originating station by way of the mobile telephone switching office and routes the communication for connection between the originating and terminating stations.

3. The method of claim 1, further comprising the step of transmitting said billing code to said terminating station as a calling line identification number.

4. The method of claim 1, wherein said step of determining whether said unitary request is valid comprises determining whether said originating station is associated with a predefined telephone line to which the billing directed communication service has been applied.

5. The method of claim 4, wherein said step of determining whether said unitary request is valid further comprises the step of determining whether said billing code corresponds to a predefined account to which the billing directed communication service has been applied.

6. The method of claim 1, wherein said step of determining whether said unitary request is valid comprises determining whether said originating station comprises a predefined cellular mobile radiotelephone to which the billing directed communication service has been applied.

7. The method of claim 6, wherein said step of determining whether said unitary request is valid further comprises the step of determining whether said billing code corresponds to a predefined account to which the billing directed communication service has been applied.

8. The method of claim 1, wherein said step of determining whether said unitary request is valid comprises determining whether said communication was received from said originating station via a predefined mobile telephone switching office to which the billing directed communication service has been applied.

9. The method of claim 8, wherein said step of determining whether said unitary request is valid further comprises the step of determining whether said billing code corresponds to a predefined account to which the billing directed communication service has been applied.

10. The method of claim 1, wherein said step of determining whether said unitary request is valid comprises determining whether said billing code corresponds to a predefined account to which the billing directed communication service has been applied.

11. In an intelligent switched telecommunications network including a switch, a service control point, and a data link functionally connecting said switch and said service control point, a method for providing a billing directed communication service, comprising the steps of:

receiving at said switch a communication from an originating station associated with an account number identifying an account that is normally charged for telephone calls initiated from the originating station, said communication comprising a unitary request for said billing directed communication service, said unitary request comprising a trigger code, a billing code identifying a billing account that is different from the account that is normally charged for telephone calls initiated from the originating station, and a terminating station number associated with a terminating station;

in response to said trigger code, sending a data link query message from said switch to said service control point;

determining at said service control point whether said unitary request is valid by comparing the received billing code to a list of billing codes in a subscriber profile; and if said unitary request is valid, sending a data link response message from said service control point to said switch, said data link response message instructing said switch to route said communication for connection between said originating station and said terminating station, and charge a cost associated with the provision of said communication to the billing account identified by the received billing code.

12. The method of claim 11, further comprising the step of transmitting said billing code to said terminating station as a calling line identification number.

13. The method of claim 11, wherein said step of determining whether said unitary request is valid comprises determining whether said originating station is associated with a predefined telephone line.

14. The method of claim 13, wherein said step of determining whether said unitary request is valid further comprises the step of determining whether said billing code corresponds to a predefined account.

15. The method of claim 11, wherein said step of determining whether said unitary request is valid comprises determining whether said billing code corresponds to a predefined account.

16. An apparatus for providing a billing directed communication service, comprising:
   means for receiving a communication from an originating station associated with an account number identifying an account that is normally charged for telephone calls initiated from the originating station, said communication comprising a unitary request for said billing directed communication service, said unitary request comprising a billing code identifying a billing account that is different from the account that is normally charged for telephone calls initiated from the originating station and a terminating station number associated with a terminating station;
   means for determining whether said unitary request is valid by comparing the received billing code to a list of billing codes in a subscriber profile;
   means for routing said communication for connection between said originating station and said terminating station; and
   means for charging a cost associated with the provision of said communication to the billing account identified by the received billing code.

17. The apparatus of claim 16, further comprising means for transmitting said billing code to said terminating station as a calling line identification number.

18. The apparatus of claim 16, wherein said originating station is associated with a predefined telephone line to which the billing directed communication service has been applied.

19. The apparatus of claim 18, wherein said billing code corresponds to a predefined account to which the billing directed communication service has been applied.

20. The apparatus of claim 16, wherein said billing code corresponds to a predefined account to which the billing directed communication service has been applied.

21. An apparatus for providing a billing directed communication service between an originating station and a terminating station, said originating station being selectively connected to said terminating station via a voice channel circuit, comprising:
   a switch operable for
      receiving a communication from said originating station associated with an account number identifying an account that is normally charged for telephone calls initiated from the originating station, said communication comprising a unitary request for said billing directed communication service, said unitary request comprising a trigger code, a billing code identifying a billing account that is different from the account that is normally charged for telephone calls initiated from the originating station, and a terminating station number associated with said terminating station,
      sending a data link query message in response to said trigger code,
      holding said communication pending receipt of a data link response message,
      routing said communication for connection between said originating station and said terminating station, and
      charging a cost associated with the provision of communication to said account; and
   a service control point functionally connected to said switch via a data link, said service control point being operable for
      receiving said data link query message,
      determining whether said unitary request is valid by comparing the received billing code to a list of billing codes in a subscriber profile, and
      sending said data link response message from said service control point to said switch, said data link response message instructing said switch to
         route said communication for connection between said originating and terminating stations via said voice channel circuit, and
         charge a cost associated with the provision of communication to the billing account identified by the received billing code.

22. A method of providing a billing directed communication service, comprising the steps of:
   receiving a communication from an originating station connected to a telephone line having an assigned account,
   the communication comprising a unitary request for the billing directed communication service, the unitary request comprising a trigger code, a billing code identifying a billing account that is different from the account assigned to the originating station, and a terminating station number associated with a terminating station;
   determining whether said unitary request is valid by comparing the received billing code to a list of billing codes in a subscriber profile associated with the account assigned to the originating station; and
   if said unitary request is valid,
      routing said communication for connection between said originating and terminating stations, and
      charging a cost associated with the provision of said communication to the billing account identified by the received billing code.

23. A method of providing a billing directed communication service, comprising the steps of:
   receiving a communication from an originating station comprising a cellular mobile radio telephone having an assigned account,
   the communication comprising a unitary request for the billing directed communication service, the unitary request comprising a trigger code, a billing code identifying a billing account that is different from the account assigned to the cellular mobile radio telephone, and a terminating station number associated with a terminating station;
   determining whether said unitary request is valid by comparing the received billing code to a list of billing codes in a subscriber profile associated with the account assigned to the cellular mobile radio telephone; and
   if said unitary request is valid,
      routing said communication for connection between said originating and terminating stations, and
      charging a cost associated with the provision of said communication to the billing account identified by the received billing code.

24. A method of providing a billing directed communication service, comprising the steps of:
   receiving a communication from an originating station associated with an account number identifying an account that is normally charged for telephone calls initiated from the originating station,
   the communication comprising a unitary request for the billing directed communication service, the unitary request comprising a trigger code, a billing code identifying a billing account that is different from the account that is normally charged for telephone calls initiated from the originating station, and a terminating station number associated with a terminating station;

determining whether said unitary request is valid by comparing the received billing code to a list of billing codes in a subscriber profile associated with the received billing code; and if said unitary request is valid,
routing said communication for connection between said originating and terminating stations, and
charging a cost associated with the provision of said communication to the billing account identified by the received billing code.

25. A method of providing a billing directed communication service, comprising the steps of:

receiving a communication from an originating station associated with an account number identifying an account that is normally charged for telephone calls initiated from the originating station, the communication comprising a unitary request for the billing directed communication service, the unitary request comprising a trigger code, a billing code identifying a billing account that is different from account that is normally charged for telephone calls initiated from the originating station, and a terminating station number associated with a terminating station;

determining whether said unitary request is valid by comparing the received billing code to a list of billing codes in a subscriber profile associated with the terminating station number; and if said unitary request is valid,
routing said communication for connection between said originating and terminating stations, and
charging a cost associated with the provision of said communication to the billing account identified by the received billing code.

26. A method of providing a billing directed communication service, comprising the steps of:

receiving a communication from an originating station comprising a cellular mobile radio telephone by way of a mobile telephone switching office having an assigned account, the communication comprising a unitary request for the billing directed communication service, the unitary request comprising a trigger code, a billing code identifying a billing account that is different from the account assigned to the mobile telephone switching office, and a terminating station number associated with a terminating station;

determining whether said unitary request is valid by comparing the received billing code to a list of billing codes in a subscriber profile associated with the mobile telephone switching office; and if said unitary request is valid,
routing said communication for connection between said originating and terminating stations, and
charging a cost associated with the provision of said communication to the billing account identified by the received billing code.

* * * * *